(12) United States Patent
Kuwahara

(10) Patent No.: US 6,172,820 B1
(45) Date of Patent: Jan. 9, 2001

(54) LASER IRRADIATION DEVICE

(75) Inventor: Takashi Kuwahara, Ogaki (JP)

(73) Assignee: Sanyo Electric Co., Ltd., Osaka (JP)

( * ) Notice: Under 35 U.S.C. 154(b), the term of this patent shall be extended for 0 days.

(21) Appl. No.: 09/326,173

(22) Filed: Jun. 4, 1999

(30) Foreign Application Priority Data

Jun. 8, 1998 (JP) .................................................. 10-159133
May 17, 1999 (JP) .................................................. 11-135991

(51) Int. Cl.$^7$ ..................................................... G02B 3/02
(52) U.S. Cl. ............... 359/719; 219/121.75; 219/121.67; 219/121.72
(58) Field of Search ..................... 359/719; 219/121.75, 219/121.67, 121.74, 121.72, 121.73; 355/53

(56) References Cited

U.S. PATENT DOCUMENTS

| | | | |
|---|---|---|---|
| 5,311,348 | 5/1994 | Yamakawa | 359/216 |
| 5,662,822 | * 9/1997 | Tada et al. | 219/121.67 |
| 5,955,243 | * 9/1999 | Tanitsu | 430/311 |

* cited by examiner

*Primary Examiner*—Georgia Epps
*Assistant Examiner*—Tim Thompson
(74) *Attorney, Agent, or Firm*—Hogan & Hartson, LLP

(57) ABSTRACT

A laser irradiation device generates a linear laser beam extending in one direction, which is irradiated toward the substrate 20 to be processed. The length Lh of the emitted linear laser beam in the major axis direction is adjusted in accordance with a size of the substrate 20 to be processed or the area to be processed within the substrate 20. The adjustment of the length Lh is performed by altering the distance X between a pair of cylindrical lenses 43 and 5 of the optical system for adjusting the generated laser beam in the direction corresponding to the length Lh direction of the linear laser beam, in accordance with the required length Lh. The alteration of the distance X is performed by altering the position of one of the cylindrical lenses 43 and 5 within the optical path in forward and backward direction. The lens is, for example, one having more flexibility of layout in the optical system than the other.

19 Claims, 9 Drawing Sheets

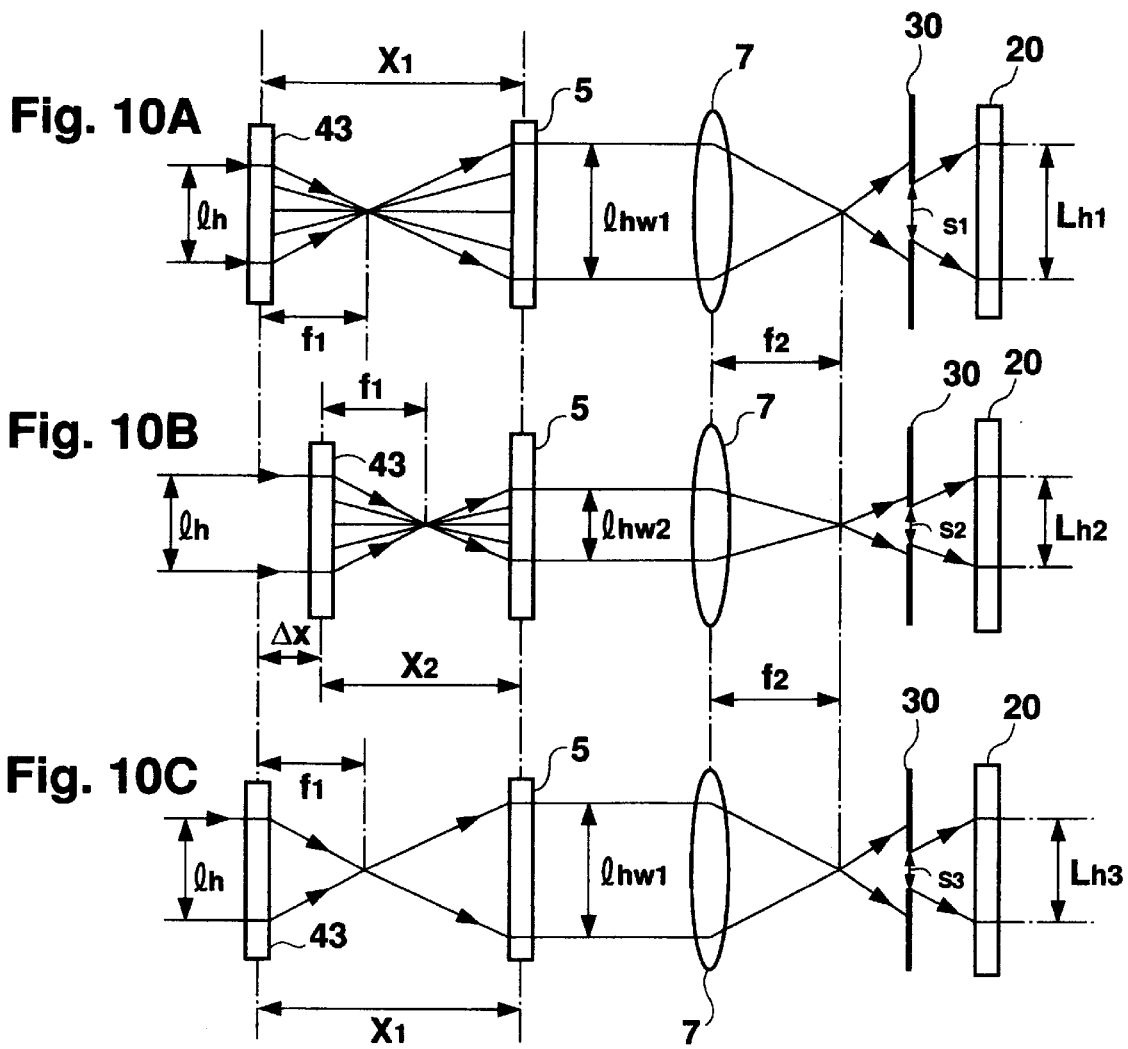
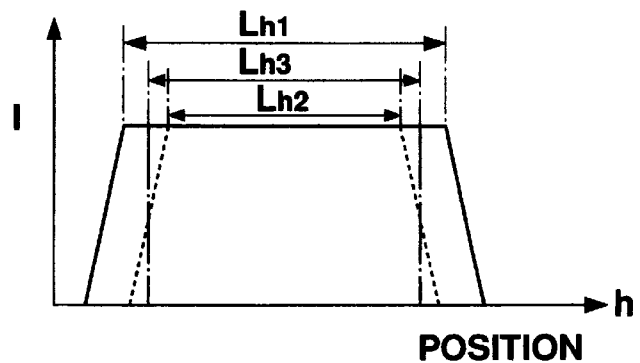
Fig. 11

LASER IRRADIATION DEVICE

BACKGROUND OF THE INVENTION

1. Field of the Invention

The present invention relates to a laser irradiation device, and more particularly to a laser irradiation device irradiating a linear laser beam whose length in the major axis can be altered using a lens optical system.

2. Description of the Related Art

Recently, a liquid crystal display (hereinafter, referred to as an "LCD") has been developed using polysilicon (hereinafter, referred to as "p-Si") as a material of switching elements, although amorphous silicon (hereinafter, referred to as "a-Si") was widely used before. In order to form or promote the grain growth of the p-Si, an annealing process using a laser beam is adopted.

FIG. 1 is a conceptual diagram showing a laser irradiation device for performing the laser annealing.

In FIG. 1, numeral 1 denotes a laser generator, numerals 2 and 11 denote reflection mirrors, numerals 3, 4, 5 and 6 denote cylindrical lenses, and numerals 7, 8, 9, 12 and 13 denote condenser lenses. Numeral 10 is a slit that defines the linear width direction of the laser beam irradiated on a substrate. A stage 14 supports the substrate 20 to be processed, on which an a-Si film is formed, and can be moved in the x and y directions.

The laser beam irradiated from the laser generator 1 has an energy distribution in the beam plane. The difference of the energy levels in the beam plane brings about a difference of annealing condition for the a-Si, which generates a variation of the film quality of the p-Si formed by the polycrystalline process depending on the location in the p-Si film. In order to eliminate such a defect, the energy level of the laser beam should be as flat as possible in the beam plane. In the device shown in FIG. 1, the laser beam is split in the horizontal and the vertical directions with respect to the optical center using a pair of cylindrical lenses 3 and 5, as well as a pair of cylindrical lenses 4 and 6. The vertically split beams are condensed by the condenser lenses 8, 9, 12 and 13 and focused in one direction (the vertical direction) as shown in FIG. 2. Thus, the energy variation of the beam is canceled in the vertical direction. At the same time, the horizontally split laser beams are condensed by the condenser lens 7 so as to cancel the energy variation and enlarged in one direction (the horizontal direction) as shown in FIG. 3. In this way, passing the cylindrical lenses 3–6, the condenser lenses 7–9, 12 and 13, the laser beam is focused in one direction and enlarged in the other direction in the irradiation plane. Thus, the laser beam becomes a linear laser beam having substantially uniform energy level in each direction in the plane, which is irradiated toward the substrate 20 to be processed. The stage 14 on which the substrate 20 is placed can be scanned by the irradiated linear laser in the linear width direction. By this scanning in the linear width direction, the annealing process can be performed for a large area. Thus, laser annealing process with high throughput can be achieved by this device.

Here, the linear longitudinal direction means the direction of the major axis of the laser beam, while the linear width direction means the direction of the minor axis of the laser beam.

FIG. 4 shows laser beam irradiation toward a mother glass substrate 30 for making multiple TFT substrates 31 on which TFT's including p-Si as an active layer are arranged, as an LCD panel on the large glass substrate 30.

On the mother glass substrate 30, a-Si is deposited and the linear laser beams 32 and 33 are irradiated scanning in the scan direction, thereby causing the a-Si to be polycrystallized to become p-Si.

However, in the conventional laser irradiation device the optical system is fixed, so the area of the linear laser beam irradiated on the substrate is fixed. Especially, since the length of the linear laser beam irradiated on the substrate in the linear longitudinal direction (the major axis direction) is fixed, there is a problem as explained below.

Each size of the plural TFT substrates 31 formed on one mother substrate 30 is determined as desired, e.g., as 2.5 inches or 3 inches by diagonal size. Therefore, if the size of the mother glass substrate, which is a to-be-processed substrate 20, or the size of the TFT substrate formed on the mother substrate changes, the laser irradiation device cannot be used anymore, which is not rational from the viewpoint of cost.

In addition, if a laser irradiation device having improper length of the linear line is used, when irradiating the laser beam toward the mother glass substrate 30 on which the TFT substrates 31 are arranged as shown in FIG. 4, for example, the whole surface of the fourth TFT substrate 31 cannot be irradiated from above in the figure by the first scan of the laser beam 32. Therefore, the fourth TFT substrates 31 is required to be irradiated by the second laser beam irradiation 33 overlaying the first irradiated area. Then, an area 35 is generated that is irradiated by both the first and second scans of the laser beam on the fourth TFT substrate 31. In this case, since the laser irradiation condition is different between the area 35 and other area, the grain size of the polycrystalline semiconductor film may be uneven within the fourth TFT substrate 31. In addition, characteristics of each TFT substrate 31 on the mother glass substrate 30 may be varied.

In order to prevent each of the irradiated laser beams from overlaying each other on a certain TFT substrate, a space 35 may be disposed for each block of the TFT substrates corresponding to the length in the major axis of the linear laser beam as shown in FIG. 5. However, this measure may cause another problem such that limitation in the size of each substrate would occur, for example, the mother substrate is required to be enlarged, or the size of the TFT substrate should be decreased. At the same time, this measure can cause decreasing number of TFT substrates that can be produced from one mother substrate, and increase of the manufacturing cost.

SUMMARY OF THE INVENTION

In view of the foregoing conventional problem, an object of the present invention is to provide a laser irradiation device that can irradiate a laser beam uniformly on the whole surface of various size of TFT substrates.

In order to achieve the above-mentioned object, a laser irradiation device of the present invention includes an optical system forming the linear laser beam extending in one direction from the laser beam emitted by a laser generator. The optical system has at least a pair of adjustment lenses being in charge of adjustment of the laser beam in the direction corresponding to the major axis direction of the linear laser beam. The distance between the pair of adjustment lenses is adjustable.

In another aspect of the present invention, the distance between the pair of adjustment lenses is realized by making at least one of the adjustment lenses movable in the optical axis direction within the optical path using a position adjustment mechanism.

Further in the above-mentioned aspect, one of the adjustment lens having more flexibility of location in the optical path than the other can be moved by the position adjustment mechanism. Thus, the distance between the pair of adjustment lenses can be changed easily with minimum change to the optical system.

In another aspect of the device according to the present invention, the device has a condenser lens for condensing the incident laser beam after passing the pair of adjustment lenses and for enlarging the incident laser beam in the major axis of the linear laser in accordance with the incident width ($l_{hw}$).

In still another aspect of the present invention, adding to the above-mentioned condenser lens, a slit is disposed between the condenser lens and the object to be irradiated, for interrupting the edge region of the laser beam emitted from the condenser lens. Since a low energy region is generated in the edge region of the laser beam, the uniformity of the energy level in the major axis direction of the linear laser beam emitted by the device can be increased by interrupting the region using the slit.

In addition, the slit width of the slit is adjustable so as to correspond to the adjustment of the length in the major axis direction of the linear laser beam.

Further, the pair of adjustment lenses are cylindrical lenses.

In another aspect of the laser irradiation device according to the present invention, the device includes an optical system forming a linear laser beam extending in one direction from the laser beam emitted by the laser generator. The optical system includes a pair of major axis direction adjustment lenses for adjustment of the laser beam in the direction corresponding to the major axis direction of the linear laser beam, a pair of minor axis direction adjustment lenses for adjustment of the laser beam in the direction corresponding to the minor axis direction of the linear laser beam, a major axis direction condenser lens enlarging the incident laser beam after passing the two pairs of adjustment lenses in the major axis direction of the linear laser in accordance with the incident width ($l_{hw}$) of the laser beam adjusted by the major axis direction adjustment lenses, a minor axis direction condenser lens for condensing the laser beam after passing the two pairs of adjustment lenses and adjusted by the minor axis direction adjustment lenses in the minor axis direction, and an adjustment mechanism for adjusting the distance between the pair of major axis direction adjustment lenses. The incident width of the laser beam entering the major axis direction condenser lens is adjusted in accordance with the distance between the pair of major axis direction adjustment lenses.

In the above-mentioned aspect, the distance between the pair of major axis direction adjustment lenses can be easily altered in the major axis direction of the laser beam by altering the position of one of the major axis adjustment lenses having higher flexibility of location in the optical path using the adjustment mechanism.

In addition, in the above-mentioned aspect, a slit can be provided between the major axis direction condenser lens and the object to be irradiated, for interrupting the edge region of the laser beam emitted by the major axis direction condenser lens, and the width of the slit can be adapted to be adjustable.

In still another aspect of the present invention, in the above-mentioned laser irradiation device, the object to be irradiated is constituted so that plural regions that are required to be irradiated are arranged in one plane. In this case, the major axis direction length of the emitted linear laser beam is set by adjusting the distance between the pair of major axis direction adjustment lenses so that the edge portion of the linear laser beam in the major axis direction can irradiate the outside of each of the plural regions requiring irradiation in one object to be irradiated.

For example, the object to be irradiated is a mother glass substrate, and the region requiring irradiation is each of plural substrates (e.g. TFT substrates) arranged in the mother glass substrate. When the a-Si film formed on the substrate is annealed by laser using the laser irradiation device according to the present invention to be polycrystallized, the major axis direction edge portion of the linear laser beam is not irradiated. Thus, the energy of the linear laser beam irradiated in one region requiring irradiation is not varied. Furthermore, in one object to be irradiated, the linear laser beam can be irradiated in the same condition toward the plural regions requiring irradiation. Therefore, a uniform annealing process can be performed, and when applying to polycrystalline process, more uniform polysilicon can be formed on the substrate.

BRIEF DESCRIPTION OF THE DRAWINGS

FIGS. 10A, 10B and 10C are diagrams for explaining the principle of altering the length Lh of the laser beam in the laser irradiation device according to the present invention.

FIG. 11 is a diagram showing the figure of the linear laser beam obtained as shown in FIGS. 10A, 10B and 10C.

DESCRIPTION OF THE PREFERRED EMBODIMENT

Figure 6:
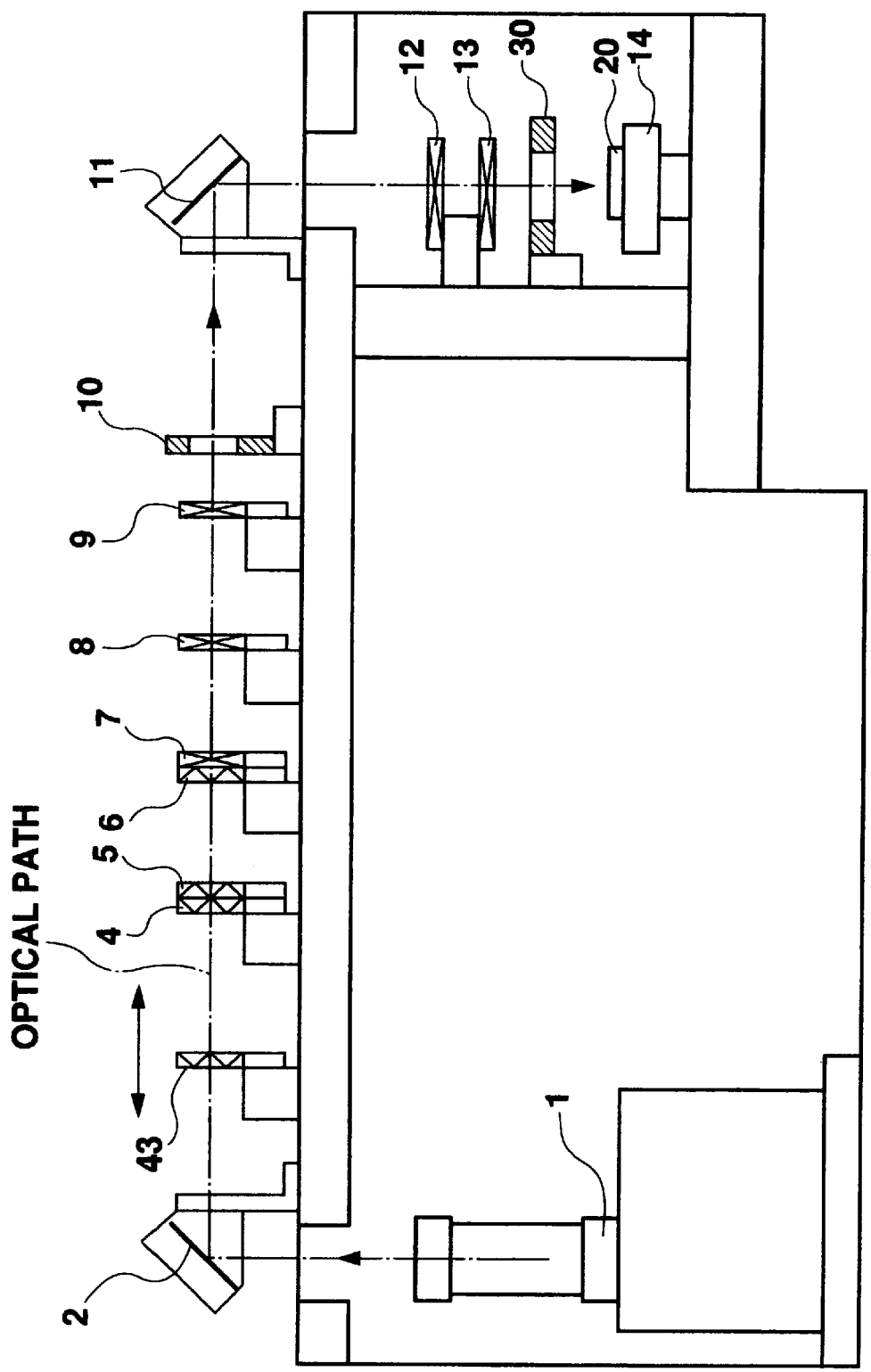
FIG. 6 is a schematic diagram of a laser irradiation device according to an embodiment of the present invention.

FIG. 6 is a schematic diagram of a laser irradiation device according to an embodiment of the present invention. In the figure, numeral 1 denotes a laser beam generator, numerals 2 and 11 denote reflection mirrors, numerals 43, 4, 5 and 6 denote cylindrical lenses. The lens 43 and the lens 5, as well as the lens 4 and the lens 6, make respective pairs. Numerals 7, 8, 9, 12 and 13 denote condenser lenses. The laser beam, after passing the two pairs of cylindrical lenses (43 and 5, 4 and 6), is focused in one direction (e.g., in the v direction) by the lenses 8, 9, 12 and 13, and enlarged in the other direction (e.g., in h direction) by the lens 7. Numerals 10 and 30 are slits restricting the width and the length of the laser beam. Numeral 14 is a stage for supporting a substrate 20 to be processed. The stage is movable in x and y directions. The slit 10 is disposed in the optical path of the lenses 9 and 12 in FIG. 6. The slit 10 restricts the minor axis direction width (Lv) of the laser beam focused by the lenses 8, 9, 12 and 13. The slit 30 is disposed at the position close to the stage 14. The slit 30 restricts the major axis direction length (Lh) of the laser beam enlarged by the lenses 7.

The optical system of the laser irradiation device according to the present invention, as mentioned above, includes cylindrical lenses 43, 5 and 4, 6, condenser lenses 7–9, 12 and 13, reflection mirrors 2 and 11, slits 10 and 30. This optical system shapes the linear laser beam into a predetermined size. Further in this system, the cylindrical lens 43 can be moved in the optical path in the forward and backward directions of the optical axis (in the horizontal direction in FIG. 6). By adjusting the position of the lens 43, the major axis direction length of the linear laser beam can be adjusted.

Figure 7:
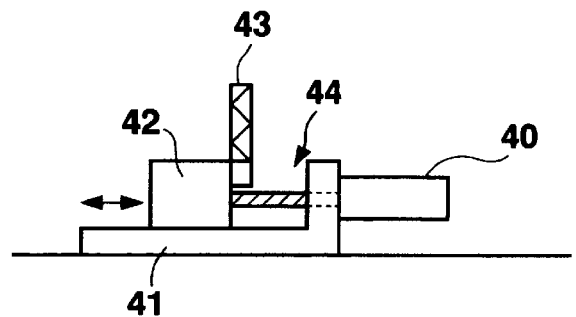
FIG. 7 is a diagram for explaining a movable mechanism of a cylindrical lens 43 according to an embodiment of the present invention.

FIG. 7 shows an example of a position adjustment mechanism for the lens 43. The cylindrical lens 43 is fixed to a movable table 42, which is connected to a feed screw 44 such as a ball screw extending from a drive portion 40 such as a micrometer or a servo motor. The movable table 42, the drive portion 40 and the feed screw 44 are disposed on a fixed table 41. When the feed screw 44 is rotated by the drive portion 40, the movable table 42 connected to the feed screw 44 slides on the fixed table 41 in the horizontal direction as shown in the figure, so that the position of the lens 43 is adjusted. This position adjustment of the lens 43 can be performed manually by using a micrometer as the drive portion 40, or can be performed automatically by using a servo motor or the like. In addition, the position adjustment mechanism is not limited to the structure shown in FIG. 7 as long as the lens 43 can be moved forward and backward in and along the optical path.

Figure 8:
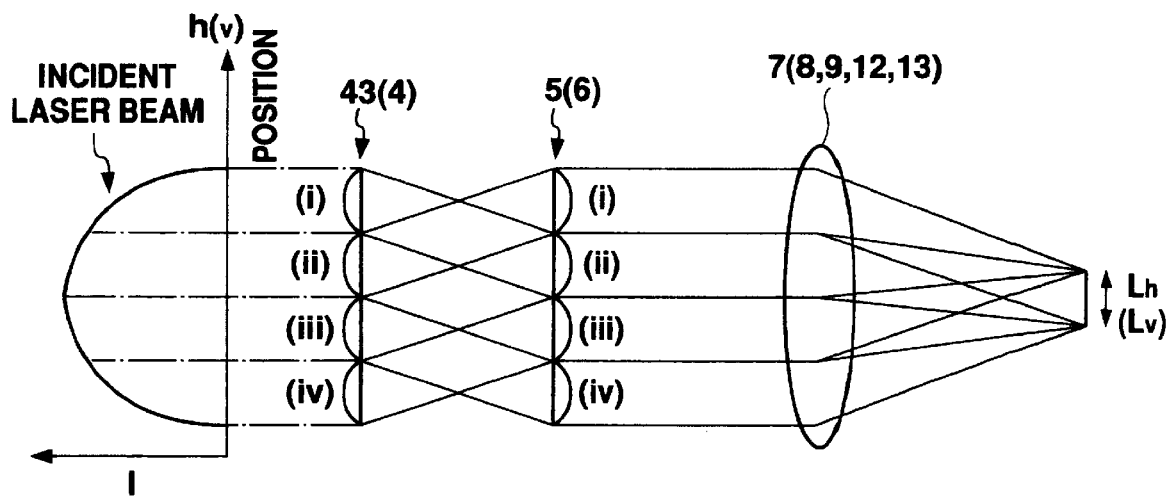
FIG. 8 is a diagram for explaining the principle of an optical system of the laser irradiation device according to the present invention.

FIG. 8 shows a concept of a homogenizer function performed by the cylindrical lens and the condenser lens in the optical system of the laser irradiation device according to the present invention. The laser beam generator 1 shown in FIG. 6 is not a complete point-source light, so the laser light entering the cylindrical lens has a certain area. In addition, the laser beam from the laser beam generator 1 has energy level distributing in the beam plane as shown in the left portion of FIG. 8. In order to change a-Si into uniform p-Si by irradiating a laser beam toward the substrate 20 to be processed, it is very important that the energy level of the laser beam is uniform in the plane. Therefore, in this optical system, a linear laser beam having uniform energy level in the plane can be obtained by the homogenizer composed of two pairs of cylindrical lenses and condenser lenses.

The pair of cylindrical lens 43 and 5 as well as the corresponding condenser lens 7 will be explained as example. The laser beam from the laser beam generator 1 is split into regions (i)–(iv) in one direction of the laser beam by the cylindrical lens 43, and each of them enters the corresponding cylindrical lens 5. The cylindrical lens 5 emits the split beams (i)–(iv) as parallel light beams. The split beams (i)–(iv), which are converted into the parallel light beams by the cylindrical lens 5, enter the condenser lens 7, which combines four split beams into one.

Figure 9A:
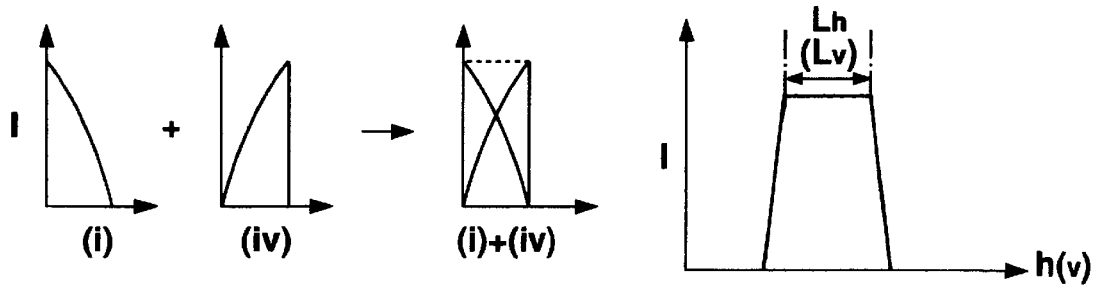
FIGS. 9A and 9B are diagrams for explaining the principle of energy level adjustment of a laser beam from the laser beam generator by the optical system shown in FIG. 8.
Figure 9B:
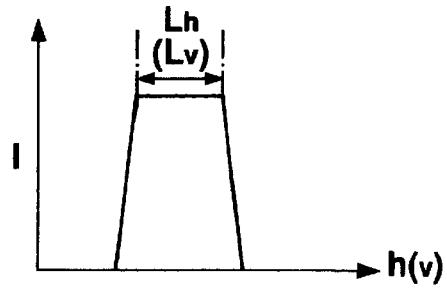

The distribution of the energy level of the laser beam from the laser beam generator 1 is substantially symmetric horizontally and vertically with respect to the optical center as shown in the graph of the left side portion in FIG. 8. When the laser beam is split into four from the optical center in one direction h (the horizontal direction) by the cylindrical lens 43 as shown in FIG. 8, a light beam having substantially uniform and predetermined energy level in unit region is obtained by combining the light beams of the region (i) and the region (iv) that are furthest from the center, as shown in FIG. 9A. In the same way, by combining the light beams of the region (ii) and the region (iii) which are adjacent to each other at the center, a light beam having substantially uniform and predetermined energy level in the unit region is obtained. These light beams of four split regions are condensed into one by the condenser lens 7. As a result, as shown in FIG. 9B, a laser beam having uniform energy level within the h direction width Lh.

In the same way, the cylindrical lens 4 and the cylindrical lens 6 split the entered laser beam into four regions (i)–(iv) and emit four parallel light beams in the other direction v (the vertical direction) that is perpendicular to the h direction in which the above-mentioned lenses 43 and 5 are in charge of the adjustment. The emitted light beams are combined into one by the condenser lenses 8, 9, 12 and 13, which make a laser beam having uniform energy level in the length Lv of the other direction v.

According to the principle mentioned above, a laser beam having uniform energy level in the h and v directions is obtained. In addition, the condenser lens 7 enlarges the laser beam in the h direction, and the condenser lenses 8, 9, 12 and 13 condense the laser beam in the v direction. Thus, a linear laser beam extending in the h direction is obtained. Hereinafter, the length in the h direction (the major axis direction) of the linear laser beam is referred to as linear laser beam length Lh, and the length in the v direction (the minor axis direction) is referred to as linear laser beam width Lv.

The linear laser beam obtained in the way described above is irradiated toward the substrate 20 to be processed. Along with the irradiation of the linear laser beam, the stage on which the substrate 20 to be processed is placed moves in the minor axis direction of the irradiated laser beam (the v direction or the width Lv direction). As a result, a laser annealing process with high throughput can be achieved by the relative scanning by the linear laser beam of the substrate 20 to be processed so that uniform laser anneal processing is performed over large area.

As mentioned above, the pair of cylindrical lenses 43 and 5 control the output of the linear laser beam in the major axis direction. Therefore, in this embodiment, in order to alter the length Lh of the linear laser beam, the lens 43, of the four cylindrical lenses, can be moved in the optical path by the above-mentioned position adjustment mechanism. It is possible that the position of the lens 5 can be changed in the optical path. In this case, the lens 43 shown in FIG. 7 can be replaced with the lens 5, and the position thereof can be adjusted in the same way.

Figure 1:
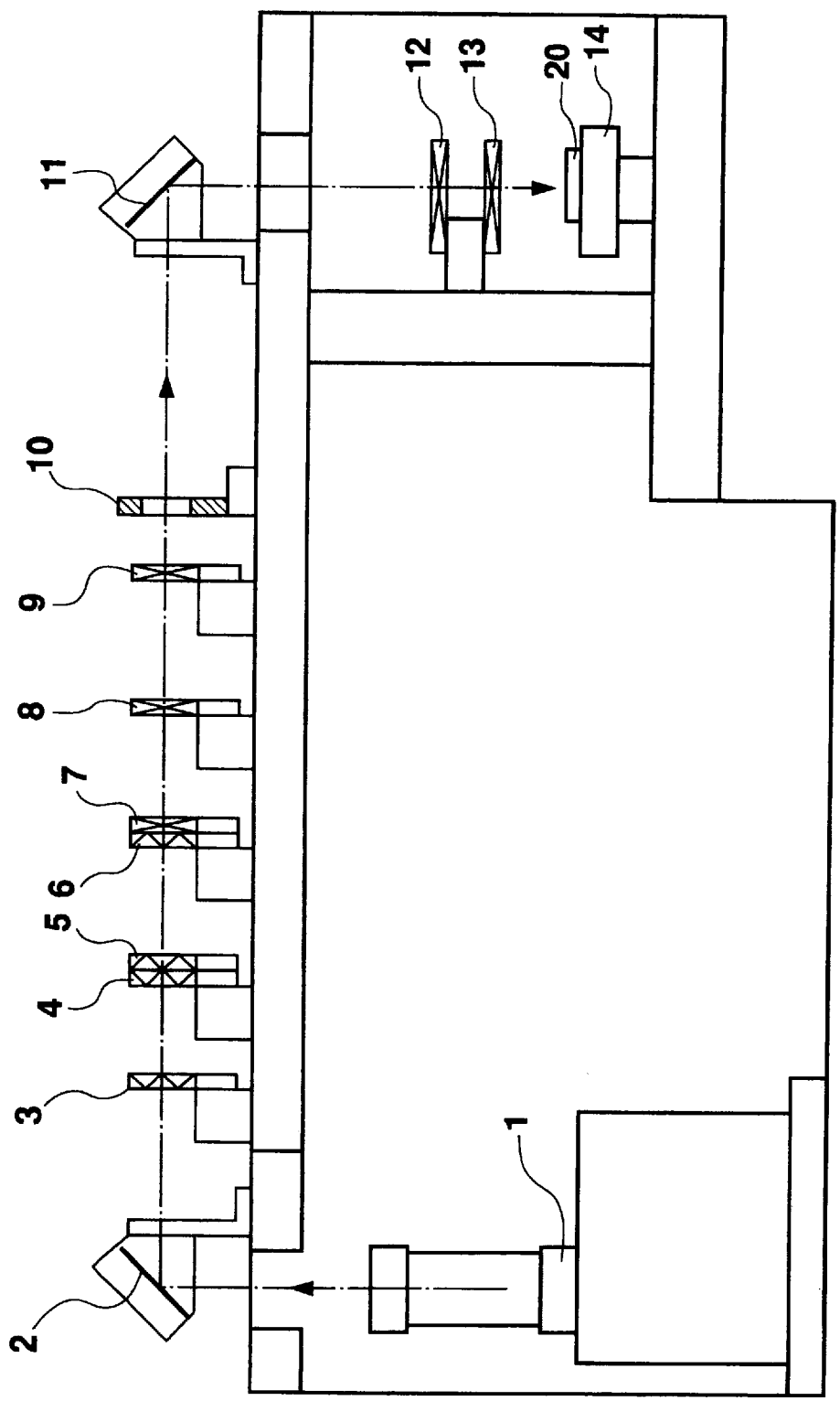
FIG. 1 is a schematic diagram of a conventional laser irradiation device.
Figure 2:
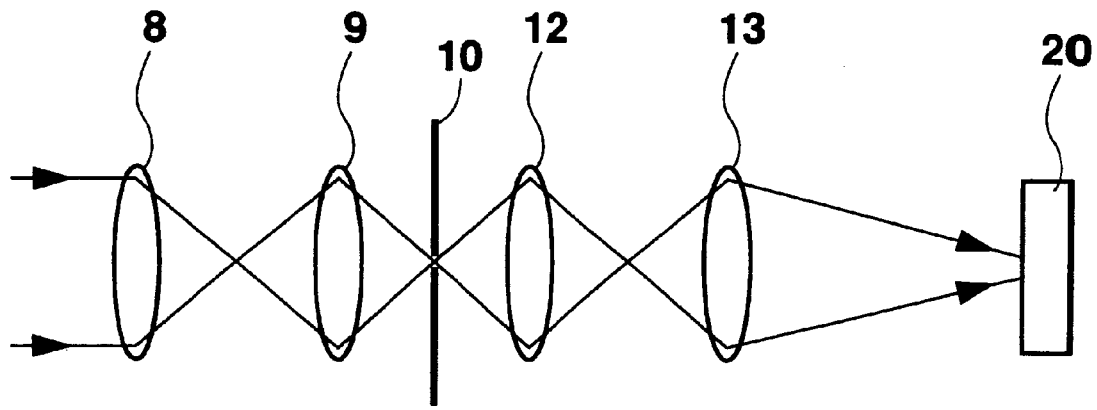
FIG. 2 is a diagram showing a part of the optical system of the device shown in FIG. 1.
Figure 3:
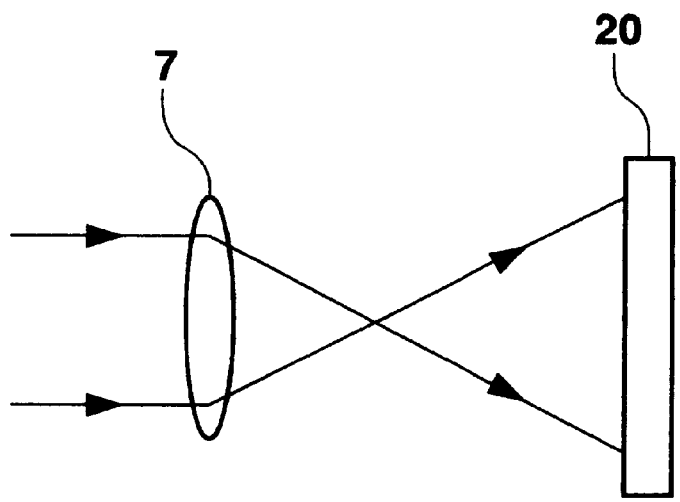
FIG. 3 is a diagram showing another part of the optical system of the device shown in FIG. 1.
Figure 4:
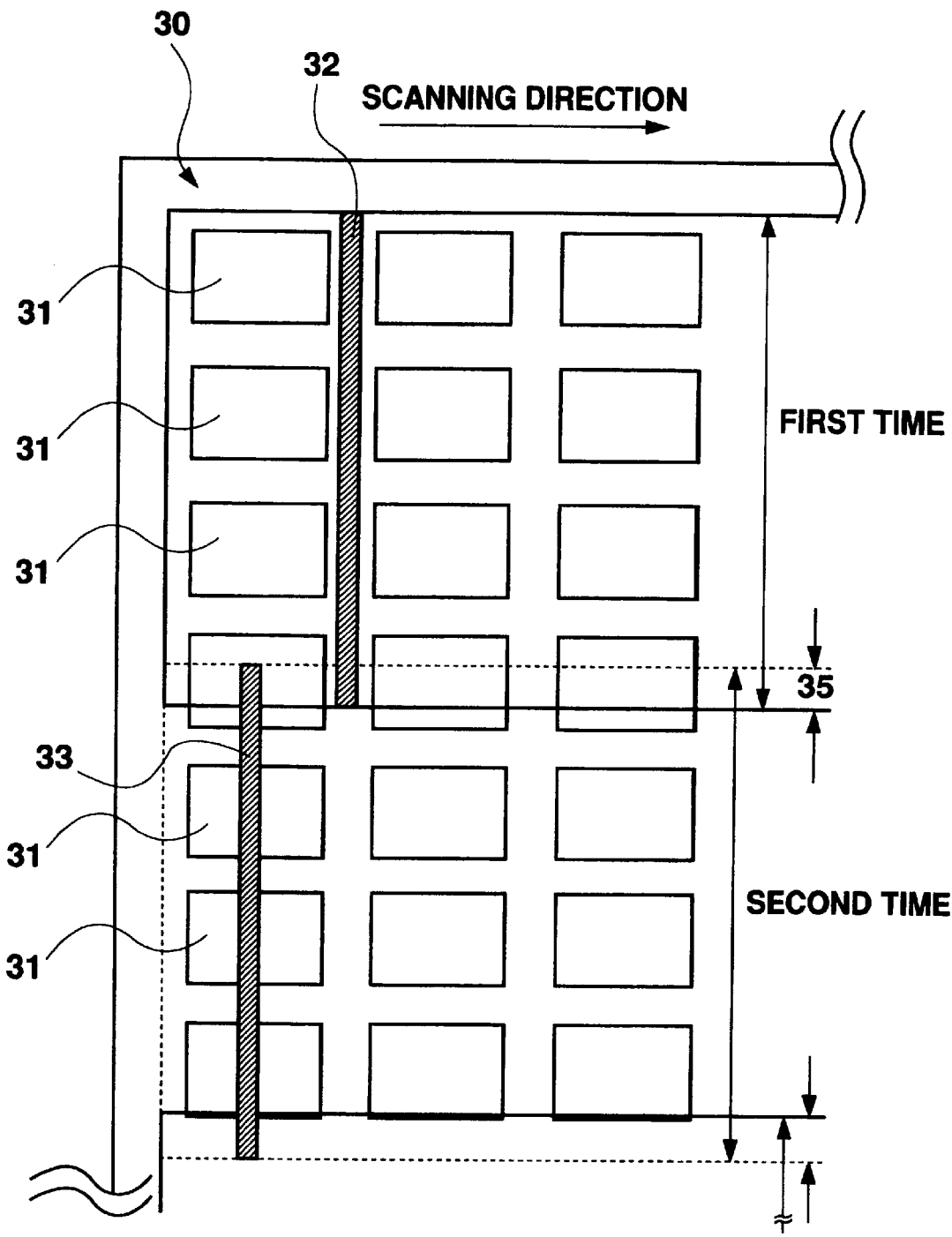
FIG. 4 is a diagram for explaining a problem of the conventional laser irradiation device when irradiating a laser beam toward a substrate.
Figure 5:
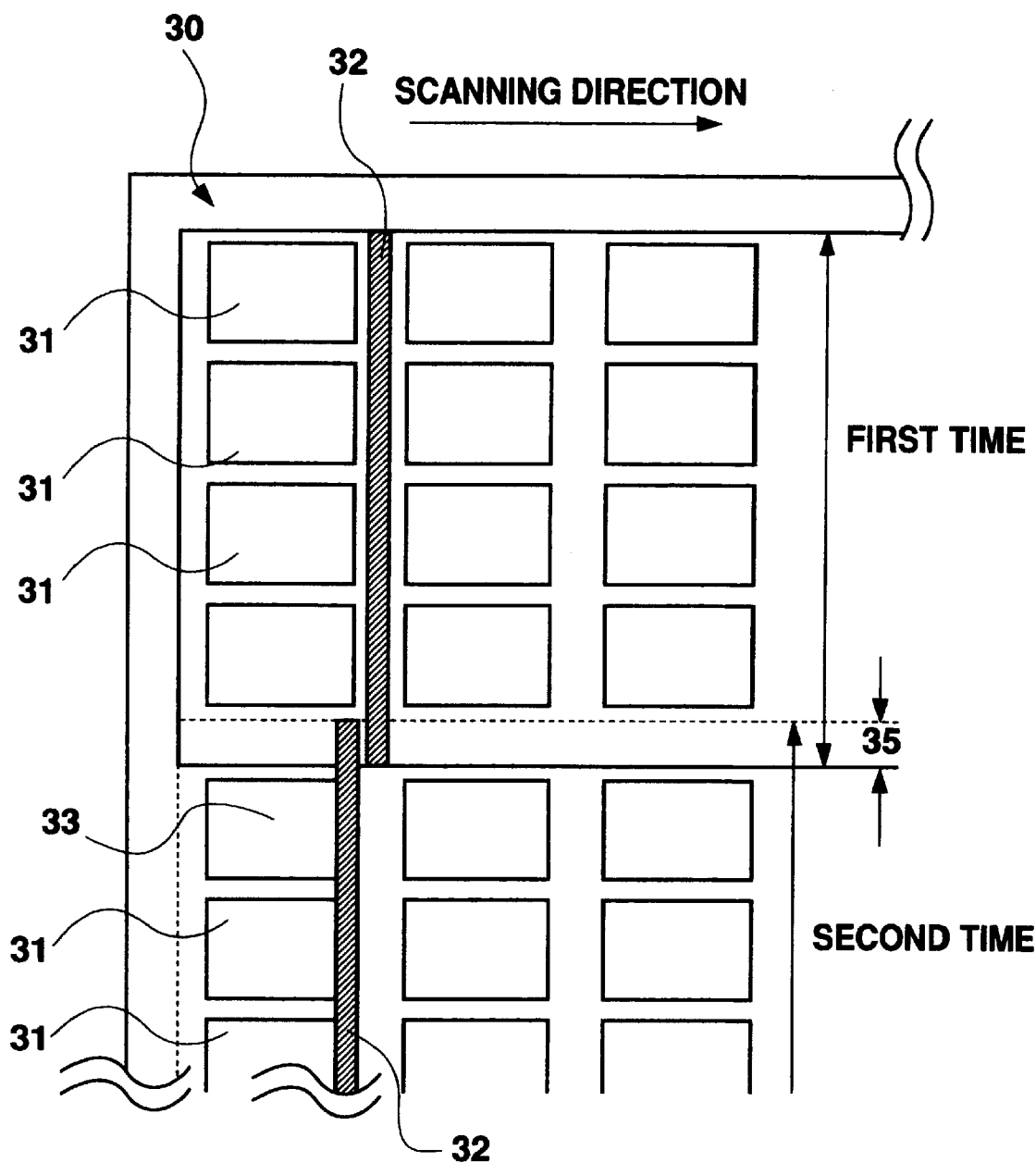
FIG. 5 is a diagram for explaining another problem of the conventional laser irradiation device when irradiating a laser beam toward a substrate.

Hereinafter, the principle of altering the major axis direction length Lh of the linear laser beam by altering the distance X between the cylindrical lenses 43 and 5 will be described with reference to FIGS. 10A and 10B. In the shown optical system, the width $l_h$ of the laser beam entering the cylindrical lens 43 from the laser beam generator 1, the focal length f1 of the cylindrical lens 43, and the focal length f2 of the condenser lens 7 are respectively fixed. Furthermore, in the optical path, positions of the condenser lens 7, slit 30 and substrate 20 to be processed, which are disposed after the lens 5, are fixed. In addition, in the actual optical path, the cylindrical lenses 4 and 6, the condenser lenses 8, 9, 12, and 13, and the slit 10 are disposed as shown in FIG. 6. Since these lenses and slit do not affect the laser beam in the h direction of the laser beam, they are omitted in FIGS. 10A and 10B. However, the functions thereof are the same as in FIG. 2. Furthermore, the cylindrical lenses 43 and 5 and the condenser lens 7 do not affect the laser beam in the v direction of the laser beam.

As shown in FIG. 10A, in the case where the distance between the cylindrical lenses 43 and 5 is X1, if the laser beam having width $l_h$ enters the cylindrical lens 43, the light beam emitted by the lens 43 is focused at the position of the focal length f1, and enters the cylindrical lens 5. Then, the light beams go out of the lens 5 as parallel beams having width $l_{hw1}$, and are combined into one by the condenser lens 7. The light beam emitted by the condenser lens 7 is focused at the position of the focal length f2. The substrate 20 to be processed is irradiated by the linear laser beam having the length of Lh1 through the slit 30.

On the other hand, as shown in FIG. 10B, when the lens 43 is moved by ΔX in the rightward direction in the figure (the backward direction in the optical path) so as to shorten the distance between the lenses 43 and 5 to X2, the length of the linear laser beam irradiated toward the substrate 20 to be processed through the slit 30 alters into Lh2. In other words, as shown in FIG. 10B, since the width $l_h$ of the laser beam entering the lens 43 and the focal length f1 are the same, the width of the laser beam entering the lens 5 becomes narrow when the distance X between the lenses 43 and 5 alters. Therefore, the width $l_{hw}$ of the parallel beams emitted by the lens 5 are narrowed from $l_{hw1}$ to $l_{hw2}$ as shown in FIG. 10A. The laser beam having the width $l_{hw2}$ is condensed by the condenser lens 7, is focused at the focal point f2, and the linear laser beam reaches the substrate 20 to be processed through the slit 30. The length of this linear laser beam becomes Lh2 in accordance with the distance X2 between the lenses 43 and 5, which is shorter than the length Lh1 shown in FIG. 10A.

On the contrary to FIG. 10B, in order to increase the length Lh of the linear laser beam irradiated toward the substrate 20 to be processed compared to FIG. 10A, the lens 43 is moved forward in the optical path so that the distance X between the lenses 43 and 5 is enlarged. Thus, the width of the beam emitted from the corresponding lens 5 becomes wider than $l_{hw1}$, and the length of the linear laser beam that reaches the substrate 20 to be processed becomes longer than Lh1 shown in FIG. 10A.

As mentioned above, by altering the distance X between the lenses 43 and 5 using the movable cylindrical lens 43, the substrate 20 to be processed is irradiated by the linear laser beam having uniform energy level in the length direction h as shown in FIG. 11.

Next, the function of the slit 30 will be explained. In the present invention, since the length of the linear laser beam emitted from the condenser lens 7 is altered, the slit 30 is not always necessary from the viewpoint of alternation of the length of the linear laser beam irradiated toward the substrate 20 to be processed. However, in the h direction edge portions of the linear laser beam emitted from the condenser lens 7, regions having lower energy level than in the middle portion are generated as shown in FIG. 11. By interrupting the low energy level region in the h direction edge portions of the linear laser beam using the slit 30, the energy level of the linear laser beam will become uniform. Therefore, in the present embodiment, the slit 30 is disposed before the substrate 20 to be processed so that the low energy level region of the linear laser beam is interrupted.

In FIG. 10A, for example, the slit width of the slit 30 is set at s1, and the low energy level region at both end portions of the linear laser beam emitted from the condenser lens 7 is interrupted. Thus, only the portion having the length Lh1 and uniform energy is irradiated as the linear laser beam toward the substrate 20 to be processed as shown in FIG. 11.

In addition, as shown in FIG. 10B, if the width of the laser beam entering the condenser lens 7 becomes $l_{hw2}$ corresponding to the distance X2 between the lenses 43 and 5 and the length of the linear laser beam going out of the condenser lens 7 becomes short corresponding thereto, a low energy level region will be generated at each end of the linear laser beam in the length direction h, in the same way as in FIG. 10A (see FIG. 11). Therefore, the slit width of the slit 30 is altered to a predetermined width s2, so a that the low energy regions at the ends of the linear laser beam are interrupted (as shown in the broken line in FIG. 11). Therefore, the substrate 20 to be processed is irradiated by the linear laser beam having the uniform energy level in the length direction h and the length Lh2, in the same way as in FIG. 10A.

If the output of the laser generator 1 in FIG. 10A is set the same as in FIG. 10B, the condition of the light loss is the same in FIG. 10A as in FIG. 10B. Accordingly, the energy intensity of the linear laser beam per unit area in FIG. 10B becomes larger than that in FIG. 10A. Therefore, in order to obtain the constant irradiation energy intensity in spite of the length of the linear laser beam, the output power of the laser generator 1 is adjusted in accordance with the distance X between the lenses 43 and 5, i.e., in accordance with the ratio in the h direction of the laser beam emitted by the laser generator 1.

FIG. 10C shows the optical system that adjusts the length Lh of the linear laser beam irradiated toward the substrate 20 to be processed by adjusting the slit width s of the slit 30. For example, when altering the slit width of the slit 30 from s1 shown in FIG. 10A to s3 shown in FIG. 10C, the linear laser beam having the length different from Lh1, e.g., the length Lh3, is irradiated toward the substrate 20 to be processed in the same condition other than the length thereof as in FIG. 10A. Namely, in FIG. 11, if the linear laser beam emitted from the condenser lens 7 has the characteristic shown in the full line, the outer region of the chain line of the linear laser beam is interrupted by the slit 30 having the width s3, so that the laser beam having the length Lh3 is irradiated toward the substrate 20 to be processed.

This adjustment of the length Lh of the linear laser beam using the slit 30 is easy and is not accompanied with the variation of the energy level in the length direction h, since the other optical system is not changed.

In addition, the adjustment of the length Lh of the linear laser beam by adjusting the position of the lens 43 is limited within the movable area of the lens 43. In order to shorten the length L of linear laser beam out of the movable area of the lens 43, the slit width s of the slit 30 can be adjusted adding to the adjustment of the distance X between the cylindrical lenses 43 and 5, as shown in FIG. 10B.

By making the slit width s of the slit 30 adjustable as explained above, the adjustable range of the major axis direction length Lh of the linear laser beam is widened. Therefore, the variation width of the mother glass substrate size that can be adapted to one laser irradiation device is also widened, as well as the variation width of the TFT substrate size, a plurality of which can be made in a mother glass substrate.

Although the adjustment of the length Lh of the linear laser beam by adjusting the slit width s is very simple, the laser beam interrupted by the slit 30 becomes unusable. Therefore, the capacity factor of the laser beam emitted by the laser generator 1 in this adjustment is not so good as in the adjustment of the length Lh by adjusting the distance X between the lenses 43 and 5. Namely, in the adjustment of the length Lh by adjusting the distance X, though the output of the laser generator can be lowered when the Lh is short, the output of the laser generator cannot be lowered even if the length Lh of the linear laser beam is shortened by narrowing the width s of the slit 30. Therefore, it is desirable to adjust the length Lh of the linear laser beam irradiated toward the substrate 20 to be processed by adjusting the distance between the cylindrical lenses 43 and 5, and if necessary, by adjusting the slit width s of the slit 30, so that the running cost of the manufacture line, as well as the manufacturing cost of the products can be lowered as much as possible.

As a matter of course, as explained above, in order to make the energy level of the linear laser beam irradiated toward the substrate 20 to be processed more uniform, it is necessary to interrupt the low energy regions generated at end regions in the length direction of the linear laser beam irradiated from the condenser lens 7 using the slit 30. Therefore, it is preferable to control so that the low energy regions of the end regions of the linear laser beam are interrupted by adjusting the length Lh of the linear laser beam by means of the distance X between the lenses 43 and 5, and by adjusting the slit width s of the slit 30 in accordance with the length Lh, even if the length itself of the linear laser beam is not adjusted by the slit width s.

Also in the present invention, it is desirable to dispose the above-mentioned slit 30 sufficiently close to the substrate 20 to be processed. This is because the diffraction of the laser beam due to the slit 30 becomes noticeable, and the low intensity regions are generated easily at the end regions of the linear laser beam irradiated on the substrate 20 to be processed, when the slit 30 goes far away from the substrate 20 to be processed. Therefore, in the present embodiment, the slit 30 is disposed at a position about 30 cm from the substrate 20 to be processed, for example.

Figure 12:
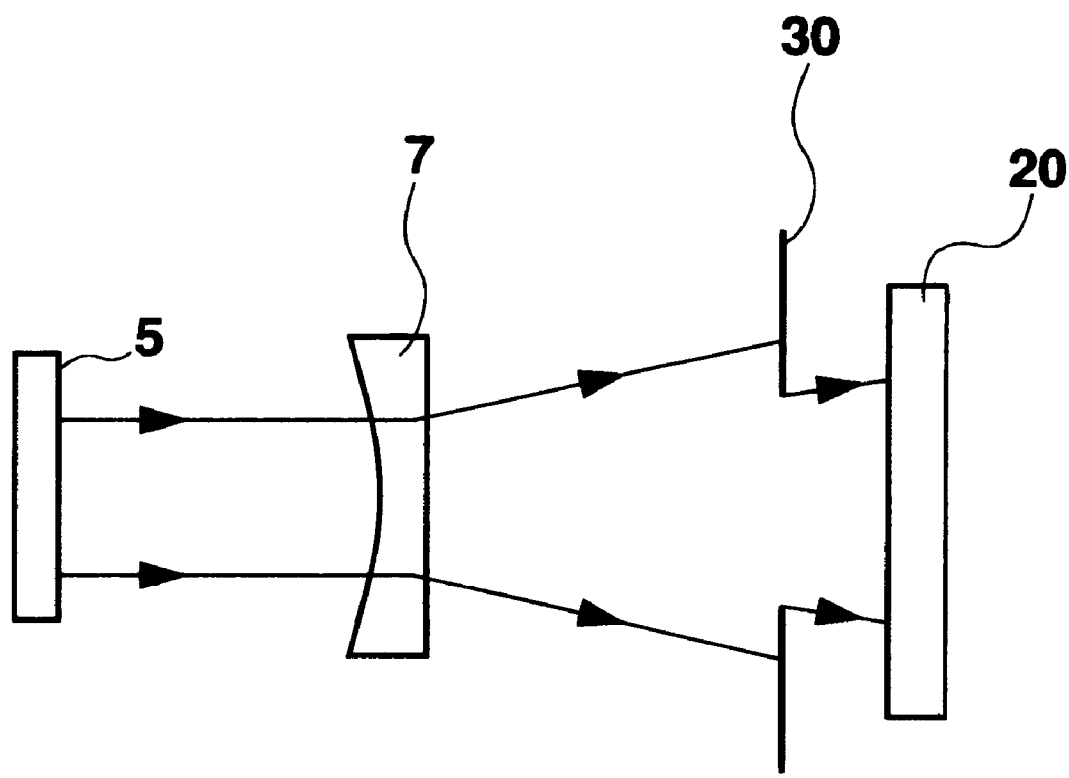
FIG. 12 is a diagram showing another structure of the condenser lens in the optical system of the laser irradiation device according to the present invention.

In the above-mentioned optical system, the convex condenser lens 7 is used as a lens for expanding the laser beam in the h direction. However, the concave condenser lens 7 can be used instead of the convex condenser lens, as shown in FIG. 12.

As explained above, the optical system of the present embodiment can alter the length Lh of the linear laser beam in the major axis direction from e.g., 150 mm to e.g., 90 mm–170 mm. However, altering the width and the values thereof are not limited to this example.

Thus, in accordance with the size of the substrate 20 to be processed, more specifically, the size of the TFT substrates, a plurality of which are arranged in the mother glass substrate, the length Lh of the irradiated linear laser beam can be adjusted. Therefore, multiple irradiation of the linear laser beam overlaid on the specific TFT substrates in the length direction h can be prevented when the laser annealing is processed to the whole mother glass substrate by scanning the laser beam plural times.

Figure 13:
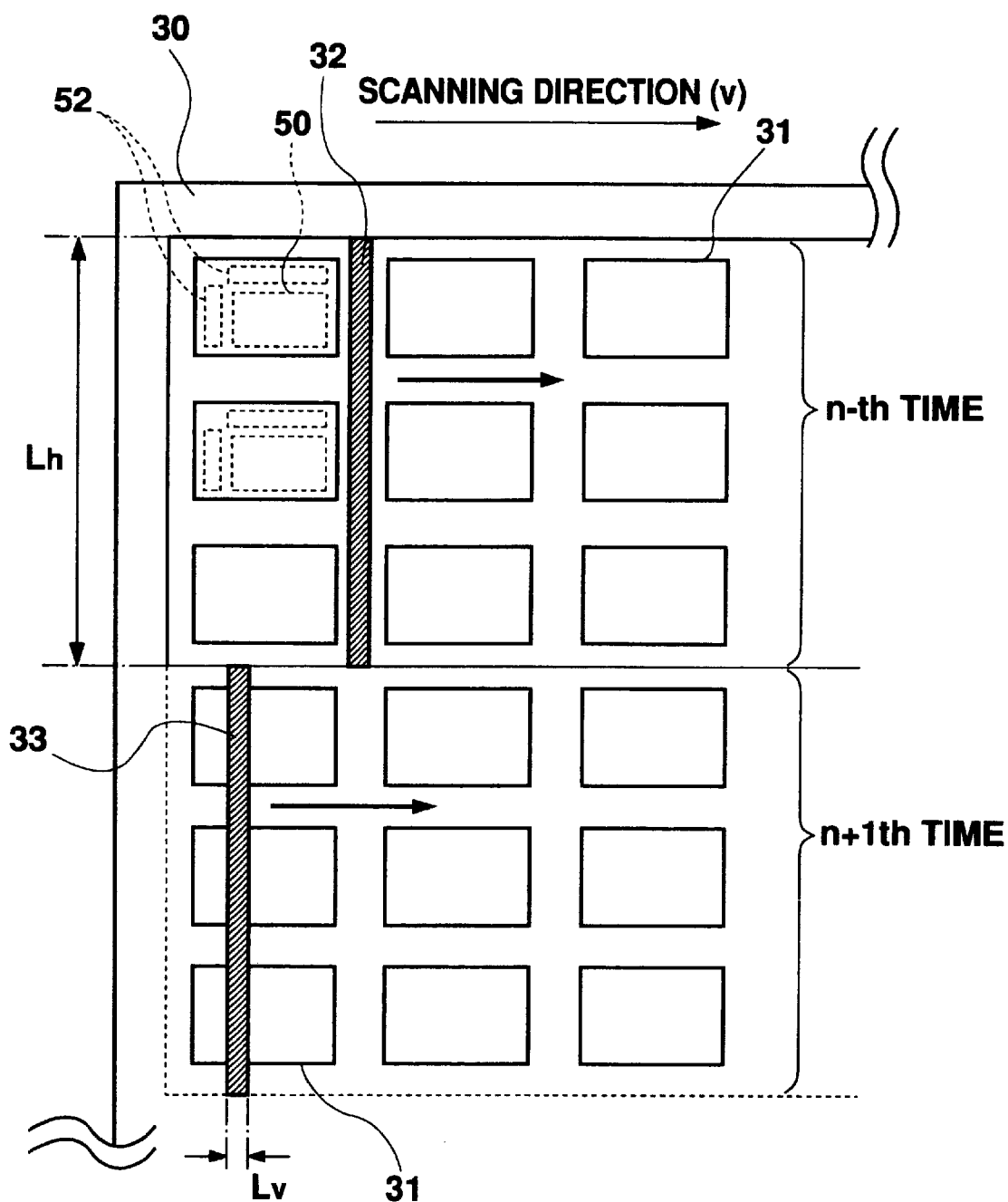
FIG. 13 is a concept diagram for explaining the state of scanning the substrate to be processed by the linear laser beam shaped the laser irradiation device according to the present invention.

As shown in FIG. 13, since the n-th laser scan and the n+1th laser scan are not overlaid on the same TFT substrate 31, each TFT substrate 31 is annealed under the same laser conditions.

As mentioned above, since the laser beam can be irradiated uniformly on each TFT substrate 31, the a-Si film formed in the region of each TFT substrate 31 can be polycrystallized under the same conditions between the TFT substrates 31 as well as in each TFT substrate 31. In other words, the laser irradiation device of the present invention can be applied to various sizes of mother glass substrate 30 that is the substrate 20 to be processed, or the size of each TFT substrate 31, even if the size is changed.

In addition, since the laser annealing can be performed under constant conditions over the whole surface of the mother glass substrate 30, a p-Si film having uniform characteristics can be formed on each TFT substrate 31. Namely, the p-Si film obtained by the laser annealing process has uniform and high mobility at any position in the mother glass substrate 30.

In a flat display device such as a liquid crystal display device or an organic electrolyte luminescent display device, this p-Si film is sometimes used for an active layer of the pixel driver TFT in the display portion 50 as shown by the broken line in FIG. 13, or of the driver TFT in the driver portion 52 formed in the periphery of the display portion. In these cases, in the display portion 50 for example, pixel driver TFT's having sufficient ON current can be obtained. In the high resolution and large screen display, even if the writing time for display data per pixel becomes short due to increase of the pixels, sufficient display data can be written in the pixel by the pixel driver TFT in the short writing time. In the same way as for the driver portion 52, driver TFT's having sufficient response speed can be formed in the driver portion, so as to be adapted to higher operation speed (shorter drive pulse) due to a high resolution and large screen of the display. While there has been described what are at present considered to be preferred embodiments of the invention, it will be understood that various modifications may be made thereto, and it is intended that the appended claims cover all such modifications as fall within the true spirit and scope of the invention.

What is claimed is:

1. A laser irradiation device comprising an optical system for emitting a linear laser beam extending in one direction, wherein the optical system includes at least a pair of adjustment lenses for adjustment of the laser beam in the major axis direction of the linear laser beam, and a length of the linear laser beam in the major axis direction is adjustable to a predetermined length independent from a length of the linear laser beam in the minor axis direction by adjusting the distance between the pair of adjustment lenses.

2. The laser irradiation device according to claim 1, wherein at least one of the adjustment lenses is movable in the optical axis direction within an optical path thereof using a position adjustment mechanism.

3. The laser irradiation device according to claim 2, wherein said one of the adjustment lenses being movable by said position adjustment mechanism has more flexibility of location within the optical path than the other.

4. The laser irradiation device according to claim 1, wherein a condenser lens is provided for condensing an incident laser beam after passing the pair of adjustment lenses and for enlarging the incident laser beam in the major axis of the linear laser beam in accordance with the incident width thereof.

5. The laser irradiation device according to claim 1, further comprising:

a condenser lens for condensing an incident laser beam after passing the pair of adjustment lenses and for enlarging the incident laser beam in the major axis of the linear laser in accordance with the incident width thereof, and a slit disposed between the condenser lens and an object to be irradiated, for interrupting an edge region of the laser beam emitted from the condenser lens.

6. The laser irradiation device according to claim 5, wherein the slit width of the slit is adjustable.

7. The laser irradiation device according to claim 1, wherein the pair of adjustment lenses are cylindrical lenses.

8. The laser irradiation device according to claim 1, wherein the object to be irradiated is constituted such that a plurality of areas requiring irradiation are arranged in a plane, the distance between the pair of adjustment lenses is adjusted, and the major axis direction length of the emitted linear laser beam is set, so that the major axis direction end portions of the linear laser beam can irradiate the outside of each of the regions requiring irradiation in one object to be irradiated.

9. A laser irradiation device comprising:

an optical system a linear laser beam extending in one direction, the optical system including a first pair of adjustment lenses for adjustment of the laser beam in a major axis direction of the linear laser beam, a second pair of adjustment lenses for adjustment of the laser beam in a minor axis direction of the linear laser beam, a major axis direction condenser lens for enlarging the incident laser beam after passing the first and second pairs of adjustment lenses in the major axis direction of the linear laser beam in accordance with the incident length of the laser beam adjusted by the first pair of adjustment lenses, a minor axis direction condenser lens for condensing the laser beam after passing the first and second pairs of adjustment lenses and adjusted the incident length by the second pair of adjustment lenses in the minor axis direction, an adjustment mechanism for adjusting the distance between the pair of major axis direction adjustment lenses; wherein the incident length of the laser beam entering the major axis direction condenser lens is adjusted in accordance with the distance between the first pair of adjustment lenses; and a length of the linear laser beam in the major axis direction is adjustable to a predetermined length differing and independent from a length of the linear laser beam in the minor axis direction.

10. The laser irradiation device according to claim 9, wherein the distance between the pair of major axis direction adjustment lenses is adjusted by altering the position of one of the major axis adjustment lenses having higher flexibility of location within the optical path using the adjustment mechanism.

11. The laser irradiation device according to claim 9, further comprising a slit disposed between the major axis direction condenser lens and an object to be irradiated, for interrupting an edge region of the laser beam emitted from the major axis direction condenser lens.

12. The laser irradiation device according to claim 11, wherein the slit width of the slit is adjustable.

13. The laser irradiation device according to claim 9, wherein the object to be irradiated is constituted such that a plurality of areas requiring irradiation are arranged in a plane, the distance between the pair of major axis direction adjustment lenses is adjusted, and the major axis direction length of the emitted linear laser beam is set, so that the major axis direction end portions of the linear laser beam can irradiate the outside of each of the regions requiring irradiation in one object to be irradiated.

14. A laser irradiation device comprising:

an optical system for emitting a linear laser beam extending one direction, wherein the optical system includes at least a pair of adjustment lenses for adjustment of the laser beam in a major axis direction of the linear laser beam;

a length of the linear laser beam in the major axis direction is adjustable to a predetermined length differing and independent from a length of the linear laser beam in a minor axis direction by adjusting the distance between the pair of adjustment lenses; and the resulting linear laser beam is irradiated on a noncrystalline semiconductor film formed on a substrate so as to polycrystalline the noncrystalline semiconductor film.

15. The laser irradiation device as defined in claim 14, wherein the noncrystalline semiconductor film formed on the substrate is formed into a plurality of discrete regions on the substrate; and every edge portion in the major axis direction of the linear laser beam is irradiated outside each of the plurality of regions.

16. A method of producing a polycrystalline semiconductor film from a noncrystalline semiconductor film by irradiating a linear laser beam, wherein the noncrystalline semiconductor film is formed into a plurality of discrete regions on a substrate;

an optical system is used for emitting the linear laser beam extending in one direction, the optical system including at least a pair of adjustment lenses for adjustment of the laser beam in a major axis direction of the linear laser beam;

a length of the linear laser beam in the major axis direction is adjusted to a predetermined length differing and independent from a length of the linear laser beam in a minor axis direction by adjusting the distance between the pair of adjustment lenses such that every edge portion in the major axis direction of the linear laser beam is irradiated outside each of the plurality of regions; and the resulting linear laser beam is irradiated on the noncrystalline semiconductor film formed on the substrate so as to polycrystallize the noncrystalline semiconductor film.

17. An optical system comprising:

a first pair of adjustment lenses for adjusting the incident length of an optical emission beam in a major axis direction; and a second pair of adjustment lenses for adjusting the incident length of the optical emission beam in a minor axis direction, wherein the incident length in the major axis direction of the optical emission beam is adjusted in accordance with the distance between lenses of the first pair of adjustment lenses and the incident lengths respectively of the major and minor axis directions of the optical emission beam are adjusted independently.

18. An optical system comprising:

a pair of adjustment lenses for adjusting the incident length of an optical emission beam in a major axis direction; and a slit means, wherein a slit width of said slit means is adjusted in accordance with the distance of lenses of the pair of adjustment lenses to provide a more uniform optical energy irradiation after the optical emission beam passes said slit means.

19. A method of adjusting incident lengths of an optical emission beam, comprising the steps of:

generating an optical emission beam by an optical system having a first and a second pair of adjustment lenses;

adjusting incident length in a major axis direction of the optical emission beam by adjusting the distance between lenses of the first pair of adjustment lenses; and adjusting incident length in a minor axis direction of the optical emission beam by adjusting the distance between lenses of the second pair of adjustment lenses, wherein the incident lengths of the major and minor axis directions of the optical emission beam are independently adjusted.

* * * * *